United States Patent [19]

Drake et al.

[11] 4,450,262

[45] May 22, 1984

[54] HYDROPHILIC COPOLYMER COMPOSITIONS USEFUL AS CONTACT LENSES

[75] Inventors: Nancy J. Drake, Painesville, Ohio; Michael D. Hilston, League City, Tex.; Mary A. O'Malley, Cleveland, Ohio

[73] Assignee: Diamond Shamrock Chemicals Company, Dallas, Tex.

[21] Appl. No.: 407,270

[22] Filed: Aug. 11, 1982

[51] Int. Cl.³ .................. C08F 220/20; C08F 220/28; C08F 220/34

[52] U.S. Cl. ............................. 526/234; 351/160 R; 351/160 H; 523/105; 523/106; 526/311

[58] Field of Search ..................... 526/311, 326, 234

[56] References Cited

U.S. PATENT DOCUMENTS

| | | | |
|---|---|---|---|
| Re. 27,401 | 6/1972 | Wichterle et al. | 260/2.5 R |
| 3,220,960 | 11/1965 | Wichterle et al. | 260/2.5 |
| 3,503,942 | 3/1970 | Seiderman | 260/80.75 |
| 3,699,089 | 10/1972 | Wichterle | 260/86.1 |
| 3,914,341 | 10/1975 | Kliment et al. | 260/885 |
| 4,109,074 | 8/1978 | Creighton et al. | 526/320 |

*Primary Examiner*—Harry Wong, Jr.
*Attorney, Agent, or Firm*—William A. Skinner; Helen P. Brush

[57] ABSTRACT

Novel hydrophilic copolymers are prepared containing a major portion of polymerized units of an hydroxyalkyl acrylate or methacrylate monomer and a minor portion of a nitro-substituted aryl acrylate or methacrylate monomer, and optionally with a minor amount of an alkylene glycol diacrylate or methacrylate as a crosslinking agent. These copolymers are made by a free radical polymerization mechanism or by gamma radiation of the reaction mixture. These copolymers are particularly useful as soft contact lens polymers, being extremely resistant to clouding and/or discoloration in use.

10 Claims, 1 Drawing Figure

4,450,262

HYDROPHILIC COPOLYMER COMPOSITIONS USEFUL AS CONTACT LENSES

BACKGROUND OF THE INVENTION

1. Field of the Invention

This invention relates to hydrophilic plastic materials useful as soft contact lenses and, more particularly, relates to hydrophilic copolymers and to their preparation and use, which compositions are extremely resistant to clouding and/or discoloration in use.

2. The Prior Art

As is already known, compositions adapted for use as soft contact lenses have been developed from hydrophilic-type polymers which are softer and more easily accommodated by the eye then are the earlier hydrophobic-type polymers such as polymethyl methacrylate and the like. Hydrophilic polymers may be defined typically as lightly cross-linked, essentially water-insoluble copolymers derived from one or more monomers containing hydroxy groups for imparting to the polymers their affinity for water. These polymers may further be defined as coherent, 3-dimensional polymer structures or networks which have the ability to absorb or imbibe water, even in large quantities, e.g., up to 90 weight %, without dissolution. When containing water in any amount whatsoever, a hydrophilic polymer will expand correspondingly and, in its hydrated state, correctly may be designated as a hydrophilic polymer "gel," or "hydrogel." A specific class of polymer hydrogels which have gained particular commercial acceptance as soft contact lenses are those derived from acrylic esters. U.S. Pat. Nos. 2,976,576 and 3,220,960 issued to O. Wichterle and D. Lim on Mar. 28, 1961, and on Nov. 30, 1965, respectively, are early patents which describe the use of methanol-insoluble hydrophilic acrylic ester polymer materials for the manufacture of soft contact lenses.

Acrylic ester hydrophilic polymers, for the most part, are derived by copolymerizing a mixture containing a major amount of a water-soluble monoester of acrylic or methacrylic acid in which the ester moiety contains at least one hydrophilic group, and a minor amount of a bifunctional diester of acrylic or methacrylic acid which cross-links the hydrophilic group-containing monomer as it polymerizes. The degree and type of cross-linking in the resulting polymer governs, to a large extent, its maximum water content, when fully hydrated.

Although accommodated much more comfortably by the wearer than the prior hard contact lenses, presently known soft contact lenses, as prepared from the aforedescribed polymer hydrogels, do have disadvantageous properties and have not been completely satisfactory. Hydrogel lenses favor the growth of pathological bacteria and fungi on their surfaces. If not regularly cleaned and sterilized or if they are stored in contaminated solutions, pathogens can be easily absorbed by the lens materials due to their flexible, hydrophilic polymer structure. Also, because of their aforesaid flexible, hydrophilic polymer structure, proteins and other normal substances in the eye environment can be easily diffused through the lenses with use. Accumulation of such substances in a soft contact lens causes its discoloration and clouding with repeated cleaning and sterilization techniques practiced by the wearer. Too, the lenses can lose sufficient amounts of water during use to deleteriously affect their dimensional stability and optical acuity.

It is an object of this invention, therefore, to provide a soft contact lens which is resistant to penetration by pathological organisms and chemicals damaging to the eye.

It is another object of this invention to provide a hydrophilic lens polymer which is sufficiently resistant to the diffusion of proteins and other migratory eye substances to prolong its life and optical effectiveness significantly.

It is yet another object of this invention to provide a soft contact lens which will retain a sufficient quantity of water during use to maintain its dimensional stability and optical acuity.

SUMMARY OF THE INVENTION

The present invention is directed to novel hydrophilic copolymers adapted to the fabrication of desirable soft contact lenses, which copolymers contain a major portion of polymerized units of an hydroxyalkyl acrylate or methacrylate monomer with a minor portion of a nitro-substituted aryl acrylate or methacrylate monomer, and optionally with a minor amount of a further monomer. The further monomer may be present either as an impurity in the primary constituents of the copolymerization mixture or may be specifically added, e.g., to provide cross-linking sites for the developing polymeric chains from said primary monomer reactants. Without adding any significant amount of additional monomer in the copolymerization process, or without any modification of the surface of said copolymer products when shaped into lenses, the copolymer obtained herein is found to be extremely resistant to protein diffusion therethrough, thus exhibiting less clouding and discoloration in use by comparison to other acrylic ester-type hydrophilic polymer lenses in commerce at this time.

BRIEF DESCRIPTION OF THE DRAWING

Other advantages of the invention will become apparent upon reading the following detailed description and upon reference to the accompanying drawing, FIG. 1. This drawing is a graph wherein the average disintegrations per minute (dpm) of lens samples fabricated from a copolymer product of this invention are plotted against the number of days these samples are stored in simulated tear solution containing $^3$H-lysozyme, compared to those exhibited by similarly tested lenses fabricated from an hydroxylethyl methacrylate (HEMA) homopolymer.

DESCRIPTION OF THE PREFERRED EMBODIMENTS

Figure 1:
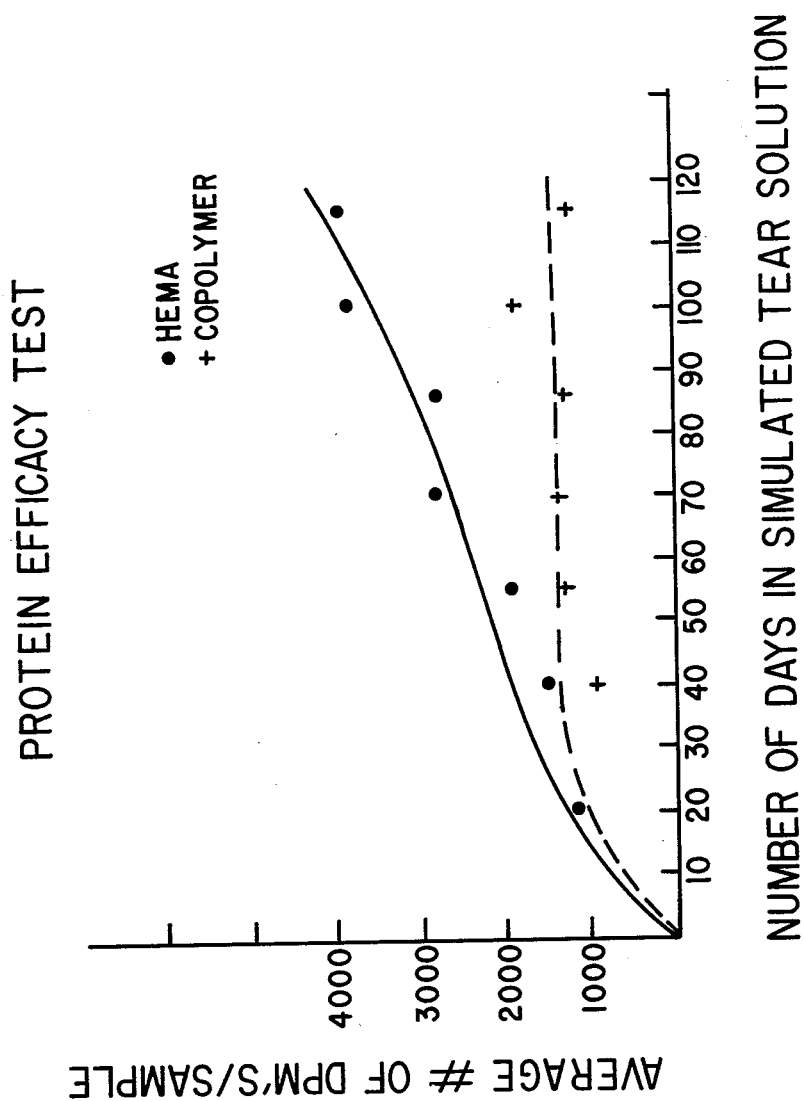

The terms "polymer" and "copolymer" as used herein in the specification and claims in defining the hydrophilic, water-insoluble products of this invention refer to a macromolecular substance which has been produced by polymerizing two principal comonomers, although such product may incidentally contain polymerized units of one or more additional known monomers in minor amounts, for purposes such as cross-linking, increasing the wettability of soft contact lens products fabricated therefrom, or otherwise.

Likewise, as used herein in the specification and claims, the terms "hydrogel" and "polymer hydrogel" are each intended to refer to a shaped hydrophilic polymer, e.g., a soft contact lens, which contains imbibed water in an amount ranging generally from less than 1% to 90% by weight of a shaped polymer. However, it is well recognized that to be completely comfortable to the eye, soft contact lenses for practical application normally contain at least about 25% water, preferably about 30% water, and still more preferably about 35% water, by weight. Accordingly, polymer hydrogels described herein as fabricated from the hydrophilic polymer products of this invention are those containing at least about 25% water by weight.

As previously stated, the hydrophilic copolymers of this invention are obtained by the simultaneous polymerization and cross-linking, in the presence of a free radical polymerization catalyst, of a mixture of:
(a) a hydroxy containing acrylate or alkacrylate;
(b) a nitro-substituted aryl acrylate or methacrylate; and optionally
(c) a cross-linking agent.

The hydroxy containing acrylates and alkacrylates and which are used in the copolymerization as component (a) may be represented by the structural formula:

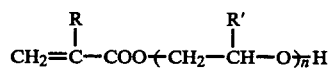

wherein R represents hydrogen or alkyl of from 1 to about 6 carbon atoms; R' represents hydrogen or alkyl of from 1 to about 6 carbon atoms, preferably hydrogen, methyl or ethyl; and n is an integer of 1 to about 6. Such hydroxy containing acrylates and alkacrylates and may correctly be called glycol and polyglycol monoacrylates and monoalkacrylates. They are well-known in the art and may be obtained by the alkoxylation of an alpha-methylene carboxylic acid, e.g., acrylic or methacrylic acid, with a vicinal alkylene oxide, such as ethylene oxide, propylene oxide or the like, until the desired amount of alkylene oxide has been reacted with the alpha-methylene carboxylic acid. Specific hydroxyalkyl acrylates and alkacrylates suitably employed as component (a) of the polymerization mixture include hydroxyethyl methacrylate (HEMA), hydroxypropyl acrylate (HPA), and hydroxypropyl methacrylate (HPMA). Normally, these monomers comprise at least about 93% by weight of the reaction mixture and of the copolymer product prepared. Percentages of the monomers preferred at present are from about 94% to 99.4%, by weight of the reaction mixture and product, with percentages ranging from 98% to 99.4% being the most preferred. The particular monomer presently preferred is hydroxyethyl methacrylate (HEMA).

The monomer used herein as component (b) of the copolymerization reaction mixture specifically is para-nitrophenyl methacrylate. This compound has the formula:

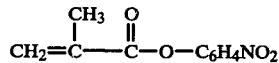

Units from this monomer generally may comprise only up to about 7% by weight of the reaction mixture and the prepared copolymer. Preferably, this monomer comprises from about 0.6% to 6% and still more preferably about 0.6% to 2% by weight of the reaction mixture and product.

As the optional component (c) of the copolymerization reaction mixture, i.e., the cross-linking agent, there may be used an alkylene glycol diacrylate or dimethacrylate, represented by the formula:

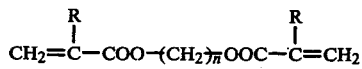

wherein R represents hydrogen or alkyl of 1 to 4 carbon atoms, and n is an integer of from 1 to about 20, preferably of from 1 to 4. As examples thereof may be mentioned ethylene glycol diacrylate, ethylene glycol dimethacrylate, propylene glycol diacrylate or dimethacrylate, and the like. Ethylene glycol dimethacrylate is the presently preferred difunctional cross-linking agent. When employed, this component normally is incorporated in extremely minor concentrations, i.e., from about 0.10% to 0.99% by weight of the polymerization mixture.

Preparation of the copolymers herein may be effected by various techniques known in the art. The process may be carried out by bulk polymerization of the comonomer mixture in the presence of a free radical polymerization catalyst, such as any of the well-known inorganic or organic peroxy compounds. These catalysts may be employed in the range of about 0.05% to about 2% by weight of the monomer components. Typical catalysts include lauroyl peroxide, benzoyl peroxide, isopropyl percarbonate, azobisisobutyronitrile (AIBN) and known redox systems such as the ammonium persulfate-sodium metabisulfite combination and the like. Irradiation such as by ultraviolet light may also be employed to catalyze the copolymerization reaction.

The copolymerization reaction generally is carried out at temperatures ranging between room temperature and 90° C., with temperatures of 50°–70° C. being preferred.

The copolymerization is advantageously carried out in bulk by preparing the comonomer mixture, adding the required quantity of free radical initiator thereto and then conducting the reaction in a sealed vessel at the selected temperature. According to presently preferred practice, the reaction mixture, after preparation, is cast into a depression on the upper surface of a glass plate. The glass plate is then covered with another having a similar depression on its lower surface. When positioned, the depression on the underside coincides with that of the lower plate to form a reservoir wherein copolymerization is effected upon heating the plate assembly at the desired reaction temperature. The reaction is conducted for a time period of 10–16 hours, depending upon the amount of reaction initiator employed, the relative proportions of the monomers and the nature of any solvent employed.

Alternatively, the reaction may be carried out in the presence of water-soluble solvents in which the monomer components are soluble. Suitable solvents include the lower aliphatic alcohols, dioxane, ethylene glycol, glycol esters or ethers, etc. When employed, the solvent will be present in the reaction medium in about equivalent volumetric proportions to the hydroxyalkyl methacrylate monomer. Upon completion of the reaction, the organic solvent may be removed by washing the reaction mixture with water, by distillation or by other known recovery procedures.

When employing an organic solvent, films may be formed by casting the copolymer solution onto a smooth surface, then drying and stripping the copolymer film therefrom. Also, polymeric products having a predetermined shape may be obtained by casting techniques using molds of the desired shape.

For a fuller understanding of the nature of this invention, the following examples are given but are not to be taken in a limiting sense. Unless otherwise indicated, all parts and percentages given are by weight.

EXAMPLE 1

A. Preparation of hydroxyethyl methacrylate/p-nitrophenyl methacrylate copolymer.

Para-nitrophenyl methacrylate (p-NO$_2$ØMA), 0.3 g, was dissolved in a solution of 15 ml (16.1 g) of hydroxyethyl methacrylate (HEMA) in 15 ml of ethylene glycol, providing a solution containing about 2% pNO$_2$ØMA by weight of total monomer. To the resulting solution were added 0.2 ml each of a 6% ammonium persulfate solution and a 12% sodium metabisulfite solution by weight. The polymerization mixture was then cast between glass plates, 3⅜ inches square. The plate assemblies were heated in an air-circulating oven maintained at 65° C. for 17–18 hours. After cooling, the clear copolymer films were removed from the plate assemblies (Sample 1A). As a control, films of HEMA homopolymer were prepared as described above, excluding pNO$_2$ØMA from the reaction mixture (Sample 1B). All films were equilibrated and stored in physiological saline solution. Duplicate sets of both the HEMA homopolymer discs and the HEMA-pNO$_2$ØMA copolymer discs were then treated with radioactive ethylenediamine ($^{14}$C-EDA) at 60° C. for 2 hours, after which they were stored in saline solution. Discs of untreated HEMA were likewise stored in saline solution as controls.

After storage for 5 days, duplicate discs of both the $^{14}$C-EDA-treated HEMA homopolymer and the $^{14}$C-EDA-treated HEMA-pNO$_2$ØMA copolymer were removed and placed in scintillation fluid for counting of labeled EDA. Samples of the untreated HEMA were also placed in scintillation fluid for checking radioactivity. This procedure was repeated after the discs had been stored in saline for 9 days. The following results were obtained, the values obtained for untreated HEMA homopolymer deemed to be due to background and quenching effects of the scintillation fluid.

TABLE 1

| Sample | Average $^{14}$Carbon Content in Lens Sample (dpm)* Days/Storage | |
|---|---|---|
| | 5 | 9 |
| Untreated HEMA homopolymer | 33 | 44 |
| EDA-treated HEMA homopolymer | 109 | 89 |
| EDA-treated HEMA-pNO$_2$ØMA copolymer | 2000 | 2145 |

*dpm = disintegrations per minute

In contrast to the low $^{14}$carbon content of an EDA-treated HEMA homopolymer (shown by the low dpm values thereof), a similarly treated copolymer product of this invention absorbs a significant quantity of EDA as evidenced by the much increased $^{14}$carbon readings. Therefore, unlike a straight HEMA-type lens material, the resistance of a copolymer product of this invention to protein absorption cannot be enhanced by treatment with EDA as taught, e.g., in U.S. Pat. No. 4,097,657.

EXAMPLE 2–4

Following the procedure as outlined in Example 1, other HEMA-pNO$_2$ØMA copolymers were prepared and then equilibrated in physiological saline solution. The amounts of the reactants employed, including those of Examples 1A and 1B, are given in the table below.

TABLE 2

| Example | HEMA (ml) | Ethylene Glycol (ml) | pNO$_2$ØMA (g) | Initiator Type | Initiator Amount |
|---|---|---|---|---|---|
| 1A | 15 | 15 | 0.3 | 6% Ammon. Persulfate | 0.2 ml |
| | | | | 12% Sodium Metabisulfite | 0.2 ml |
| 1B | 15 | 15 | — | 12% Sodium Metabisulfite | " |
| 2 | 15 | — | 0.1 | 12% Sodium Metabisulfate | " |
| 3 | 15 | — | 0.03 | 12% Sodium Metabisulfite | " |
| 4 | 15 | — | 1.00 | 12% Sodium Metabisulfite | " |

EXAMPLE 5

To illustrate that a HEMA-pNO$_2$ØMA hydrophilic copolymer of this invention is resistant to proteinaceous and other opacifying and contaminating materials without further structural modification, specimen discs of the copolymer products of Examples 1–4 were placed in separate vials each containing 2.5 mls of a simulated tear solution containing $^3$H-lysozyme. This solution contained the following ingredients for each liter of aqueous solution:

0.9% NaCl
0.5988% lysozyme
0.0012% $^3$H-lysozyme
0.06% albumin
0.04% urea
0.04% gamma-globulin
0.04% beta-globulin
0.004% glucose The vials were maintained in a 37° C. shaker water bath for 24 hours. At the end of this time period, the specimen discs were removed from the sample vials and successively cleaned in commercial lens cleaning solution and disinfected by boiling in 0.9% saline for approximately 20 minutes. Some of the disinfected samples were placed in scintillation fluid and counted for $^3$H uptake which corresponds to bound protein. The remaining disinfected samples were placed in fresh 2.5 ml samples of the $^3$H-tear solution and the aforedescribed storage procedure at 37° C. for 24 hours was repeated, followed by cleaning and disinfection of the samples and counting some for $^3$H absorption/adsorption. This procedure were carried out for 115 days, with the results obtained as follows.

TABLE 3

| Sample | dpm's* Retained Days/Storage | | | | | | |
|---|---|---|---|---|---|---|---|
| | 25 | 40 | 55 | 70 | 85 | 100 | 115 |
| 1B | 1384 | 1577 | 1949 | 2827 | 2718 | 3814 | 3924 |
| 1A | 1061 | 961 | 1319 | 1402 | 1364 | 1957 | 1287 |
| 2 | 1619 | 1461 | 1890 | 1970 | 1811 | 2442 | — |
| 3 | 1443 | 1623 | 2031 | 2726 | 2704 | 3474 | 3737 |
| 4 | 797 | 920 | 1497 | 1342 | 1067 | 1818 | 1090 |

*As previously described

These results indicate that the HEMA-pNO$_2$ØMA copolymer products of this invention are much more resistant to the absorption/adsorption of protein therein, by comparison to the HEMA homopolymer tested. The concentration of pNO$_2$ØMA in those copolymers showing more significant resistance to protein absorption (Samples 1A, 2 and 4) varies from about 0.6% to about 6% by weight of the total monomer mixture.

The aforesaid enhanced resistance to protein absorption/adsorption exhibited by a copolymer product of this invention by comparison to HEMA homopolymer is graphically illustrated in accompanying FIG. 1. The amount of protein diffused in or adhered to the copolymer lens (as evidenced by the number of dpms counted for such samples with continued storage in the simulated tear solution) is found to reach a maximum in about 40 days storage time and then to remain essentially at this level throughout the balance of the storage test. In contrast, the protein absorption/adsorption by the HEMA homopolymer (Sample 1B) keeps increasing with continued storage in the $^3$H-tear solution. By the end of the test, it can be seen that the resistance to protein diffusion of an optimal copolymer product of this invention (Sample 4) is approximately four times greater than that of a the HEMA homopolymer.

EXAMPLE 6

This example illustrates that copolymer products of this invention can easily be machined into lens shapes which are subsequently converted to soft contact lenses by hydration.

Aliquots of a mixture containing 60 ml HEMA (64.38 g) and 0.8 g of pNO$_2$ØMA were placed in polypropylene beakers which, in turn, were placed in glass, rubber stoppered bottles in a nitrogen atmosphere. These were placed in the gammator for 200 minutes, thus supplying 1.73×10$^5$ rads. There was obtained a HEMA copolymer containing 1.24% pNO$_2$ØMA by weight (Sample 6A).

Another copolymer was prepared as described above, employing 1.2 g pNO$_2$ØMA for each 60 ml of HEMA. The reaction mixture aliquots, in a nitrogen atmosphere, were maintained in the gammator for 400 minutes, thus providing 3.46×10$^5$ rads thereto. The finished copolymer contained 1.86% of pNO$_2$ØMA by weight (Sample 6B).

Further copolymers were prepared employing, in each instance, 60 ml HEMA, and 0.12 g benzoyl peroxide as the free radical initiator. In one of these mixtures (Sample 6C), 0.8 g of pNO$_2$ØMA was incorporated; and in the second (Sample 6D), 1.2 g of pNO$_2$ØMA was used. Sample 6E employed only HEMA and initiator. All of these copolymers were prepared in aliquots, in a vacuum oven, under a nitrogen atmosphere at 65° C. for 20 hours. A sample of HEMA only (Sample 6F) was subjected to gamma radiation for 200 minutes, supplying approximately 1.73×10$^5$ rads.

Prior to hydration, the copolymer shapes were cut into contact lenses by Platt Contact Lens Service, Inc., Mansfield, Ohio, with the following results:

TABLE 4

| Sample | % pNO$_2$ØMA, by Wt. | Type of Initiator | Machineability |
|---|---|---|---|
| 6A | 1.24 | Radiation | Cut well, optics good |
| 6B | 1.86 | Radiation | Cut well, optics fair-good |
| 6C | 1.24 | Benzoyl Peroxide | Poor, material too soft |
| 6D | 1.86 | Benzoyl Peroxide | Cut smoothly, although quite soft |
| 6E | — | Benzoyl Peroxide | Material too soft to cut |
| 6F | — | Radiation | Cut well, optics poor |

EXAMPLE 7

Polymerization reaction mixtures as follows were placed in a nitrogen-purged oven at 65° C. for approximately 36 hours.

TABLE 5

| Sample | HEMA | pNO$_2$ØMA g. | Solvent ml | Initiator |
|---|---|---|---|---|
| A | 16.1 | 0.3 | Ethylene Glycol 15 | 0.2 ml 6% ammonium persulfate 0.2 ml 12% sodium metabisulfite |
| B | 16.1 | — | Ethylene Glycol 15 | 0.3 g benzoyl peroxide |
| C | 32.2 | 0.6 | — | 0.4 ml 6% ammonium persulfate 0.4 ml 12% sodium metabisulfite |
| D | 32.2 | 0.6 | — | 0.6 g benzoyl peroxide |

The above reaction mixtures, A, B and D successfully polymerized while mixture C did not. Samples of each copolymer prepared were leached with water for two weeks after preparation, while other samples thereof were stored in air for the same time period.

The infrared spectra of all of the samples, both leached and unleached, were obtained. A nitrophenyl methacrylate band was observed at approximately 1350 wavelengths in all of the spectra, indicating that no major changes in composition of the copolymer materials were brought about through leaching.

Water of Hydration

The water content of hydrated HEMA-pNO$_2$ØMA copolymer lenses was determined by first taring a weighing dish, then weighing the dish and the lens together, and calculating the weight of the copolymer lens material through difference. The hydrated lens samples were placed in an oven maintained at 75° C. for approximately 64 hours. The dried samples were weighed again and the differences in this weight and that of the dish alone was the weight of the unhydrated samples. The percentage of absorbed water was obtained by determining the amount of which was the difference between the hydrated and unhydrated sample.

The percentage of absorbed water was determined by obtaining the weight of the absorbed water (difference between weights of the hydrated and unhydrated samples) and dividing this value by the weight of the hydrated sample. Using this procedure, copolymer samples, A and B above, were found to have about 38.5% of absorbed water; those of Sample D absorbed about 35.7% water by weight.

Contact Angle Measurements

The contact angles of stationary water drops (approximately 5 μl) on lens samples of the above-described copolymer formulations were measured on a Ramé-Hart goniometer. Films of the copolymers were thoroughly washed, rinsed and cut into samples that would lie flat. These were then equlibrated with distilled water prior to measurement. Each sample, in turn, was placed on a microscope slide and anchored, carefully wiped free of surface water, and then placed in the goniometer for application of the water droplet and measurement. A HEMA homopolymer was also tested as a control. The following results were obtained:

| Sample | Average Water Contact Angle - ° |
| --- | --- |
| A | 61.5 |
| B | 61.0 |
| D | 61.5 |
| alpha[1] | 59.5 |
| Control | 58.5 |

[1]Copolymer obtained by polymerizing a mixture containing 21.5 g of HEMA and 0.27 g of pNO$_2$ØMA in a gammator for 200 minutes.

Copolymer products of this invention prepared using free radical initiation appear to be slightly less water-wettable than either the HEMA homopolymer control or the copolymer prepared through gamma radiation, as evidenced by the foregoing water contact angle measurements obtained therefor.

EXAMPLE 8

For the oxygen transmissibility test, copolymer Samples A and D, and homopolymer Sample B of Example 7 above were employed. Also, a copolymer was used which had been prepared from a polymerization mixture containing 20 ml (approximately 21.5 g) HEMA and approximately 0.27 g pNO$_2$ØMA (1.26% pNO$_2$ØMA by weight). Aliquots of the prepared reaction mixture were then placed in polypropylene test tubes and placed in the gammator for 200 minutes (1.73×10$^5$ rads generated). The resulting copolymer samples (Sample E) were equilibrated as previously described. Finally, a HEMA homopolymer (Sample F) was prepared by irradiating 60 ml HEMA for 200 minutes (1.73×10$^5$ rads).

Oxygen Transmissibility

The oxygen permeability apparatus consisted of a barometer, a thermistor with tele-thermometer, a Clark-type polarographic oxygen electrode, an oxygen monitor, a chart recorder, a magnetic stirrer, and a two-chambered plastic cell fastened together with screws. The copolymer film sample to be tested was clamped between the cell halves, with an oxygenated saline solution in the one chamber and an oxygen-depleted saline solution, electrode and stirring bar in the other chamber. The increasing oxygen concentration in the electrode chamber was monitored as a function of time and plotted by the chart recorder. The oxygen flux, J, was calculated from $$J = \left(\frac{F-I}{t}\right) S_o \left(\frac{AP}{760}\right) \frac{V}{100 A} 1000 \frac{\mu l\ O_2(STP)}{cm^2\ hr}$$

where $\left(\frac{F-I}{t}\right)$ is the % saturation change of O$_2$ per hour,
AP is atmospheric pressure (mm Hg),
V is the electrode chamber volume (cc),
A is the area of the sample being measured (cm$^2$), and
S$_o$ is the solubility (in cc O$_2$ (STP)/100 cc solution) of oxygen at that chamber temperature (T°C.), atmospheric pressure (760 mm Hg), and [Cl$^-$] (which is usually 5140 ppm Cl$^-$).

The 'dissolved' oxygen permeability, P$_d$, is found from the formula $$P_d = \frac{JL}{\Delta pO_2}$$

where
L is the sample thickness (cm)
ΔpO$_2$=the oxygen partial pressure difference between the upper and lower chambers at the point on the chart where $\left(\frac{F-I}{t}\right)$ is analyzed.

In the test, the magnetic stirrer was spun at a speed beyond which further increases did not influence electrode response. Gas bubbles were carefully excluded from the electrode chamber, and the seal around the sample was necessarily air-tight. O$_2$ consumption by the electrode was minimized by measuring percent oxygen saturation periodically rather than continuously. Using this procedure, the following oxygen permeability values were obtained:

| Sample | Type | Initiator | O$_2$ Transmissibility* P$_d$ |
| --- | --- | --- | --- |
| A | Copolymer | (NH$_4$)$_2$S$_2$O$_8$ Na$_2$S$_2$O$_5$ | 2.93 × 10$^{-4}$ |
| B | Homopolymer | (NH$_4$)$_2$S$_2$O$_8$ Na$_2$S$_2$O$_5$ | 2.65 × 10$^{-4}$ |
| D | Copolymer | Benzoyl Peroxide | 2.17 × 10$^{-4}$ |
| E | Copolymer | IRRN | 2.67 × 10$^{-4}$ |
| F | Homopolymer | IRRN | 2.91 × 10$^{-4}$ |

*P$_d$ = μl O$_2$(STP) cm/cm$^2$ Hr MM Hg

What is claimed is:

1. A hydrophilic copolymer adapted to the fabrication of soft contact lenses resistant to the diffusion of proteins and other lens opacifying agents therein, which polymer comprises
   (a) at least about 93% by weight of polymerized units of a hydroxy containing acrylate or alkacrylate having the structural formula:

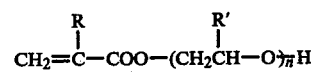

wherein R represents hydrogen or alkyl from 1 to 6 carbon atoms; R' represents hydrogen or alkyl from 1 to 6 carbon atoms; and n is an integer of 1 to 6; and (b) at least about 0.6% to about 7.0% by weight of polymerized units of a p-nitrophenyl acrylate or methacrylate.

2. The hydrophilic copolymer of claim 1 which additionally contains at least about 0.10% to about 0.99% by weight of polymerized units of a cross-linking agent as component (c).

3. The copolymer of claim 1 in which component (a) is hydroxyethyl methacrylate.

4. The hydrophilic copolymer of claim 2 in which the cross-linking agent is an alkylene glycol diacrylate monomer having the structural formula:

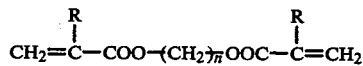

wherein R represents hydrogen or alkyl of 1-4 carbon atoms; and n is an integer of 1 to 20.

5. The hydrophilic copolymer of claim 4 in which the cross-linking monomer is ethylene glycol dimethacrylate.

6. A method for producing the hydrophilic copolymer of claim 1 which comprises copolymerizing a monomeric mixture consisting essentially of an hydroxyalkyl methacrylate and a p-nitrophenyl methacrylate in the presence of from 0.05% to about 2% by weight of the monomers of a free radical polymerization catalyst and at a temperature ranging between room temperature and 90° C. for a time period of 10–16 hours.

7. The method of claim 6 in which the monomeric mixture consists of about 94% to 99.4% hydroxyethyl methacrylate by weight and about 0.6% to 6% para-nitrophenyl methacrylate.

8. The method of claim 6 in which the monomeric mixture consists of about 98% to 99.4% hydroxyethyl methacrylate by weight and about 0.6% to 2.0% para-nitrophenyl methacrylate.

9. The method of claim 6 wherein the free radical polymerization catalyst is an ammonium persulfate-sodium metabisulfite combination.

10. The method of claim 7 in which the monomeric mixture additionally contains ethylene glycol dimethacrylate monomer as a cross-linking agent.

* * * * *